3,826,777
FLAME RETARDANT DIALLYLIC PHTHALATE
MOLDING COMPOUNDS
James Larue Thomas, Hamilton Square, N.J., and Harry Hoyt Beacham, Langhorne, Pa., assignors to FMC Corporation, New York, N.Y.
No Drawing. Continuation-in-part of abandoned application Ser. No. 182,853, Sept. 22, 1971. This application Aug. 11, 1972, Ser. No. 279,878
Int. Cl. C08g 51/04
US. Cl. 260—42.18　　　　　　　　　　　　　6 Claims

ABSTRACT OF THE DISCLOSURE

Flame retardant diallylic phthalate molding compounds with such greatly improved thermal stability that they do not release corrosive gases during exposure to temperatures of 200° C. and above, in a sealed environment, are obtained by the use of hexabromobiphenyl in amounts of 0.5 to 20% together with 5 to 60% alumina trihydrate as synergist for the hexabromobiphenyl based on the allylic polymer. These novel compositions can contain reinforcing fibers, fillers, polymerization initiators, release agents, colorants, glass coupling agents, inhibitors and other incidental additives conventionally used in thermosetting molding compounds. Allylic monomers are not required in the compositions of this invention.

CROSS REFERENCE TO RELATED APPLICATIONS

This application is related to U.S. Patent Application Ser. No. 95,418, filed Dec. 4, 1970, and is a continuation-in-part of U.S. Ser. No. 182,853, filed Sept. 22, 1971 and now abandoned.

This invention relates to diallylic phthalate molding compositions which are used to produce electrical insulation which is flame-retardant and thermally stable at temperatures of at least 200° C. in a sealed environment.

There is a growing need for high temperature resinous materials particularly for use as electrical insulation. The trend to miniaturization, for technical reasons, such as shortened circuit lengths, as well as for the more obvious needs for space and weight savings, are at least in part responsible for the compacting of more circuits into a given volume which is accompanied by greater heat concentration, the heat arising from external sources as well as impedance effects within the insulation. It is, therefore, desirable to have electrical insulation which not only exhibits low impedance heating effects, which alone can be functions of temperature, but which is also resistant to heat regardless of source.

Besides heat resistance, electrical insulation should also exhibit resistance to burning because of the constant hazard arising from potential igniting energy. It appears that at least to some degree the needs for heat and flame resistance in electrical insulation are mutually contradictory.

The best electrical properties in molded insulation are obtained with non-polar materials. Absence of strong permanent dipoles and polarizable moieties makes for minimum ionic conductivity and dielectric loss. Flame retardant insulation systems, on the other hand, invariably contain polar groups, and they release free acids or bases at flame temperature. Few materials are sufficiently non-polar for electrical insulation and are yet capable of releasing sufficient acid or base to snuff out flames.

The most common allylic flame retardant electrical insulators are those containing halogenated materials, either as part of the resin system or as additives. Halogens alone require such a high concentration of polarity to provide flame resistance that electrical properties suffer. Hence, synergists are normally employed to increase the efficiency of halogen, apparently by promoting release of the halogen acid at flame temperature. The most effective synergist is antimony oxide.

Diallyl phthalate and diallyl isophthalate resins are recognized as good electrical insulators at elevated temperatures, the former maintaining excellent electrical properties (high insulation resistance and low dielectric loss) at temperatures up to 170° C., while the isophthalate shows little change at 250° C. Commercial molding compounds based on diallyl isophthalate show retention of properties for long periods of time at temperatures well in excess of 200° C. By Arrhenius projection, 50% of original flexural strength is maintained after aging at 215° C. for 20 years.

There has been a long search to find flame retardant additives for allylic resins which will not detract from electrical and mechanical properties of the resins, particularly at elevated temperatures. One of the best of these additives to date has been diallyl chlorendate synergized with antimony oxide. A similar system based on chlorendic acid-containing polyesters is lower cost but poorer electrically. The latter is used commonly in many commercial flame-retarded molding compounds. Neither of these additives yield flame-retardant molding compounds which exhibit the high level of heat resistance found with allylic resins alone.

A special system in which diallyl chlorendate is precured on antimony oxide and then added to allylic molding compounds has been developed. However, even this system shows some thermal instability relative to the unmodified resin, although stability is greatly improved over flame-retardant allylic compounds based on diallyl chlorendate monomer.

The thermal stability deficiencies of known flame-retardant allylic resin systems are accentuated when heated in a sealed enclosure where evolved gases from decomposition are retained. It appears that among the early decomposition products is hydrogen chloride which has an autocatalytic effect, thereby accelerating the rate of still further decomposition of diallylic phthalate resins. In addition the released hydrogen chloride severely attacks metal conductors and other materials in the environment. It appears that chlorendic acid, whose derivatives until now have been considered the best source of halogen, has a measurable rate of dehydrohalogenation at elevated temperatures, and, once this acid begins to release in an enclosed atmosphere, catastrophic failure occurs soon after.

In accordance with the present invention, there is provided an additive system which can be used as a flame retardant for both diallyl phthalate and diallyl isophthalate polymers and with no sacrifice in electrical, mechanical or thermal stability properties of electrical insulation molded from these diallylic phthalate polymers. This additive system consists of (1) hexabromobiphenyl synergized by (2) alumina trihydrate or alumina trihydrate plus a low level of antimony oxide. This additive system appears unique in the following respects, all desirable:

(1) It is very effective at low levels, that is, requires half, or less, as much additive for comparable flame resistance.

(2) Surprisingly, hexabromobiphenyl is synergized by low cost alumina trihydrate which is superior electrically to antimony oxide.

(3) This system does not release hydrogen halide at temperatures up to at least 220° C. in a sealed environment. Hence, there is no corrosion of metal inserts or acid attack on other components in the system.

The additive system of this invention is used to render diallyl phthalate and diallyl isophthalate molding compounds flame resistant by additions of 0.5 to 20 percent hexabromobiphenyl and 3 to 60 percent alumina trihydrate, and, perferably, 1.5 to 15% hexabromobiphenyl and 8 to 55% alumina trihydrate by weight based on the allylic polymer. The percentage of resin in the total composition should be at least 30% by weight of the molding compound.

These novel molding compounds contain a polymerization initiator and can contain release agents, colorants, glass coupling agents, additional fillers and other incidental additives in amounts commonly used in thermosetting molding compounds.

Quite surprisingly, the compositions of this invention do not require added monomer, which has conventionally been required in diallylic phthalate molding compounds made flame retardant by use of halogenated aromatic additives.

Diallylic phthalate prepolymers useful in practicing this invention include prepolymers made from the diallylic esters of ortho-, iso-, and terephthalic acids. These diallylic phthalates may be manufactured by polymerizing a monomeric material to produce a solution of soluble prepolymer in monomer. Polymerization is carried to a point short of gelation. The prepolymer must then be separated from the unpolymerized monomer. This may be done by treatment with a solvent which dissolves the monomer and precipitates the prepolymer. Such a general process is described by Heiberger in U.S. Pat. 3,096,310. A conventional method of separating allylic prepolymer from monomer, by precipitating the prepolymer in an unreactive liquid precipitant, that is, a solvent for the monomer and a non-solvent for the prepolymer in a shearing zone, is described by Willard in U.S. Pat. 3,030,341. Prepolymers may also be separated from unpolymerized monomer by distillation, as disclosed by Mednick et al. in U.S. Pat. 3,285,836, issued May 28, 1968. The diallyl phthalate prepolymers are solids containing little or no monomer; they can be stored indefinitely in this form, since they require catalysts and either heat, actinic light or nuclear particle radiation to convert them to the insoluble or thermoset stage.

A wide variety of water-insoluble, inert fillers may be used in preparing the molding compounds of this invention. Useful fillers include calcium carbonate, both precipitated and wet ground types, calcium silicate (wollastonite), silica, hydrated clays, calcined clays, chalk, calcium sulfate (anhydrous), barium sulfate, asbestos, glass (powered), quartz, aluminum trihydrate, aluminum oxide, antimony oxide, magnesium oxide, inert iron oxides and groundstone such as granite, basalt, marble, limestone, sandstone, phosphate rock, travertine, onyx and bauxite. Additionally, inert fibrous materials, such as synthetic fibers, glass fibers, asbestos and cellulosic fibers, may be used. Up to 200 parts by weight of filler and/or fiber per 100 parts by weight of polyunsaturated polymerizable materials-polychlorinated aromatic compound may be used in these molding compositions.

Fillers, both particulate and fibrous, best used in molding compounds designed for sensitive electrical and electronic applications, should be inert and have a low level of ionic impurities as measured in the Water Extract Conductance Test described in the examples. Typical useful fillers include silica, ground glass, clays, preferably calcined clays (aluminum silicate), magnesium silicate, wollastonite (calcium silicate), quartz, alumina, alumina trihydrate, and antimony oxide. Inert fibrous fillers useful in practicing this invention include, but are not limited to, glass fibers, synthetic polymeric fibers such as polyester fibers, acrylic fibers, and nylon fibers and mineral fibers such as asbestos fibers.

Catalysts known to be useful for accelerating the cure of diallylic phthalate molding compositions are generally useful in practicing this invention. These catalysts include t-butyl perbenzoate, dicumyl peroxide, 2,5-dimethylhexane-2,5-diperbenzoate and other catalysts that cure diallylic phthalate prepolymers at elevated temperatures.

Additional additives found useful in practicing this invention and which are commonly used in diallylic molding compounds are glass coupling agents, internal mold release agents, selected pigments and inhibitors. Useful glass coupling agents include vinyl-tris (2-methoxyethoxy) silane and gamma methacryloxypropyl-trimethoxysilane. Internal mold release agents useful in diallylic phthalate molding compositions are also useful in practicing this invention, and these include fatty acids such as lauric acid and salts of fatty acids such as calcium stearate. In some cases it is desirable to include in these novel molding compounds an inhibitor such as hydroquinone or other inhibitors known to be useful in diallylic phthalate molding compositions to retard cure.

The novel molding compositions of this invention are prepared in conventional equipment and using techniques well known in the plastics industry to be useful in compounding allylic, epoxy, and polyester molding compounds. The molding compounds may be filled or unfilled and of the premixed, powdered, granular or dough type.

The following examples are provided to illustrate this invention further. The proportions in the examples are by weight unless otherwise indicated.

The test methods appearing in the following list were followed in testing the molded test specimen made from the various compositions disclosed in the examples.

(A) Flexural strength _____ ASTM D–790.
(B) Modulus of elasticity in flexure (flex. mod.) _____ ASTM D–790.
(C) Arc resistance _____ ASTM D–495.
(D) Izod impact _____ ASTM D–256.
(E) Insulation resistance _____ ASTM D–257.
(F) Deflection temperature _____ ASTM D–648.
(G) Water absorption _____ ASTM D–570.
(H) Specific gravity _____ ASTM D–792.
(I) Dielectric constant (D.C.) _____ ASTM D–150.
(J) Dissipation factor [1] (D.F.) _____ ASTM D–150.
(K) Volume and surface resistivity ____ ASTM D–257.
(L) Flame resistance, helical coil, ignition and burning time _____ ASTM D–229.
(M) Hardness (Rockwell M) _____ ASTM D–785.
(N) Water Extract Conductance Test___ Federal Standard LP 406.

[1] The wet test is conducted on samples which were conditioned by immersing the samples for 24 hours at 23° C. in distilled water, removing the samples, blotting them dry and then testing the samples as soon as practical according to the test method.

EXAMPLES

The diallyl phthalate prepolymers used in the following formulations were dissolved in sufficient acetone to make a solution containing 50% solids. The remaining ingredients were stirred into the acetone solution which was then blended with the chopped glass fiber in a mixer. This mixture was then air dried to remove most of the acetone, then the dried mixture was compounded on a two-roll mill for 2 minutes. The two-roll mill was a differential mill with the fast roll heated to 160° F. and the slow roll heated to 200° F. The milled product was cooled, granulated and screened to remove fines. Test specimen were molded from the granulated molding compound at 3000 p.s.i. for 5 minutes at 150° C.

Samples molded from the formulations set forth below were tested for thermal stability in a stainless steel "pipe bomb," a test chamber made from two-inch, inside diameter, stainless steel pipe threaded at each end to receive an appropriate pipe cap containing a Teflon ® gasket, as follows: a piece of 1/8" silicon rubber (Durometer A of 60 per ASTM test D–2240–68) was placed between two 1/2" x 1/4" x 5" bars molded from the formulations set forth below and the test specimens were wired into an assembly with several turns of No. 16 gauge copper wire. The wired assembly was sealed in the "pipe bomb" and stored for 72 hours at 220° C. The samples and inside of the "pipe bomb" were visually examined for evidence of deterioration, degradation, development of crystals and the molded bars were tested to determine retained flexural strength.

The retained flexural strength shows that the comparison samples retained only 22% of their flexural strength compared to 86 and 98% retention by the samples of the invention. Moreover, the comparison sample sublimed large amount of crystalline phthalic anhydride and severely corroded the copper wire.

The observations and test data are in the following Table.

4. The composition of claim 1 in which the diallylic phthalate prepolymer is selected from the group consisting of diallyl orthophthalate and diallyl isophthalate prepolymers.

5. The composition of claim 4 further comprising up to 200 parts by weight of an inert filler selected from the group consisting of inert mineral fillers and inert fibrous fillers per 100 parts of diallylic phthalate prepolymer.

6. The composition of claim 4 further comprising up to 400 parts by weight of fiber glass per 100 parts of diallylic phthalate prepolymer.

|  | Example 1 | Example 2 | Comparison |
|---|---|---|---|
| Formula: | | | |
| Diallyl phthalate prepolymer (Dapon 35) | 875 | | 875. |
| Diallyl isophthalate prepolymer (Dapon M) | | 875 | |
| tert-Butyl perbenzoate | 25 | 25 | 25. |
| Calcium stearate | 10 | 10 | 10. |
| Vinyl-tris(2-methoxyethyl)silane | 12 | 12 | 12. |
| Glass strands (¼ inch) | 850 | 850 | 900. |
| Hexabromobiphenyl (Firemaster BP-6) | 50 | 50 | |
| Alumina trihydrate (Alcoa 331) | 375 | 350 | 50. |
| Antimony oxide | | 25 | 176. |
| Diallyl chlorendate monomer | | | 176. |
| Properties: | | | |
| Heat deflection temp. (° C.) | 294 | 312 | 300. |
| Izod impact (ft. lbs.) | 1.37 | 1.01 | 1.10. |
| Rockwell hardness (M) | 112 | 112 | 111. |
| Flexural strength (p.s.i.) | 22,800 | 10,950 | 19,000. |
| Flexural modulus $\times 10^{-6}$ (p.s.i.) | 1.96 | 1.40 | 1.86. |
| Mold shrinkage (in./in.) | 0.004 | | |
| Water extract conductance (megohm-cm.)$^{-1}$: | | | |
| 6 days | 22 | | 31. |
| 12 days | 43 | | 45. |
| D.C. $10^3/10^6$, as is | 4.5/4.4 | 4.4/4.3 | 4.5/4.4. |
| D.C. $10^3/10^6$, wet | 4.5/4.4 | 4.7/4.3 | 4.5/4.4. |
| D.F. $10^3/10^6$, as is | .008/.006 | .011/.006 | .010/.006. |
| D.F. $10^3/10^6$, wet | .009/.006 | .013/.006 | .013/.006. |
| D.C. $10^2/10^3/10^4/10^5$ at 200° C | 6.3/5.7/5.3/5.1 | | |
| D.F. $10^2/10^3/10^4/10^5$ at 200° C | .18/.06/.04/.03 | | |
| Vol. resistivity (ohm-cm.) R.T. | $3.0 \times 10^{15}$ | $6.0 \times 10^{14}$ | $6.0 \times 10^{15}$. |
| Surface resistivity (ohm) R.T. | $5.0 \times 10^{15}$ | $4.0 \times 10^{15}$ | $4.0 \times 10^{15}$. |
| Vol. resistivity at 200° C. (ohm-cm.) | $9.0 \times 10^{11}$ | | |
| H₂O absorption (48 hrs. at 50° C.) | 0.11 | 0.14 | |
| Specific gravity | 1.81 | 1.78 | |
| Arc resistance, seconds | 151 | | |
| Helical coil ignition time (seconds) | 99 | 99 | 90. |
| Helical coil burning time (seconds) | 67 | 36 | 31. |
| Insulation resistance, ohm, wet (16 hrs. at 130° C.) | $8.0 \times 10^{12}$ | | |
| Stainless steel pipe bomb test 220° C. for 72 hrs. retained flexural strength (p.s.i.). | 19,600 | 10,700 | 4,180. |
| Visual examination: Silicone rubber | Slightly softened | Slightly softened | Deteriorated to small flakes. |
| Copper wire | Bright, no corrosion | Bright, no corrosion | Black, severely corroded. |
| Bomb interior, phthalic anhydride crystals | Very slight amount of crystals. | Very slight amount of crystals. | Large amount of crystals. |

What is claimed is:

1. A filled, flame-retardant, thermosetting diallylic phthalate molding composition containing at least 30% by weight diallylic phthalate prepolymer which in the thermoset state does not release corrosive gases at temperatures of at least 200° C. in a sealed environment comprising (a) a diallylic phthalate prepolymer, (b) 0.5 to 20% by weight hexabromobiphenyl based on prepolymer, (c) 3 to 60% by weight alumina trihydrate based on prepolymer, and (d) a polymerization initiator in sufficient amount to convert the molding composition to the thermoset state at elevated temperatures.

2. The flame-retardant composition of claim 1 in which the hexabromobiphenyl is present in the amount of 1.5 to 15% by weight based on diallylic phthalate prepolymer.

3. The flame-retardant composition of claim 1 in which the alumina trihydrate is present in the amount of 8 to 55% by weight based on diallylic phthalate prepolymer.

References Cited

UNITED STATES PATENTS

| 3,331,797 | 7/1967 | Kopetz et al. | 260—28.5 |
| 3,362,928 | 1/1968 | Dontje et al. | 260—41 |
| 3,624,024 | 11/1971 | Caldwell | 260—40 R |
| 3,441,535 | 4/1969 | Beocham et al. | 260—40 R |
| 3,677,999 | 7/1972 | Denk et al. | 260—Dig. 24 |

OTHER REFERENCES

Frankenhoff et al.: "Look What's Happening in Premix Molding Compounds," *Plastics Technology* (August 1969), pp. 43–6.

Chemical Abstracts, 57:16900d Aug. 30, 1962.

ALLAN LIEBERMAN, Primary Examiner

S. M. PERSON, Assistant Examiner

U.S. Cl. X.R.

260—40 R, Dig. 24, 42.44, 42.52